United States Patent [19]

Roberts et al.

[11] Patent Number: 5,100,970

[45] Date of Patent: Mar. 31, 1992

[54] DYE POLYMER/SOL-GEL COMPOSITES

[75] Inventors: Michael R. Roberts, Rochester; Bradley K. Coltrain, Fairport; Sharon M. Melpolder, Hilton, all of N.Y.

[73] Assignee: Eastman Kodak Company, Rochester, N.Y.

[21] Appl. No.: 623,490

[22] Filed: Dec. 4, 1990

Related U.S. Application Data

[60] Continuation-in-part of Ser. No. 504,505, Apr. 4, 1990, abandoned, which is a division of Ser. No. 358,056, May 30, 1989, Pat. No. 4,948,843.

[51] Int. Cl.$^5$ ............ C08F 8/42; C08F 26/06; C08F 14/16; C08F 20/56
[52] U.S. Cl. .................. 525/342; 525/366; 525/370; 525/417; 526/258; 526/291; 526/303.1
[58] Field of Search ............................ 525/342

[56] References Cited

U.S. PATENT DOCUMENTS

| 4,374,933 | 2/1983 | Scholze et al. | 528/38 |
| 4,374,933 | 2/1983 | Scholze et al. | 521/64 |
| 4,950,587 | 8/1990 | Roberts et al. | 430/570 |

OTHER PUBLICATIONS

Avnir et al., Journal of Non-Crystalline Solids 74 (1985) 395–406.

Primary Examiner—Joseph L. Schofer
Assistant Examiner—Wu C. Cheng
Attorney, Agent, or Firm—L. George Legg

[57] ABSTRACT

Dye-containing polymers wherein the dyes are organic in nature are incorporated into glasses produced by a sol-gel technique. The glasses may be inorganic or organic-modified metal oxide heteropolycondensates. The dye-containing polymers are covalently bonded to the glass through a linking group. The products of this invention can be used to make optically clear colored films which can be employed in the imaging, optical, solar heat energy and related arts.

4 Claims, No Drawings

DYE POLYMER/SOL-GEL COMPOSITES

RELATED APPLICATION

This application is a continuation-in-part of U.S. Ser. No. 504,505 now abandoned, filed Apr. 4, 1990 which is a division of parent case U.S. Ser. No. 358,056, filed May 30, 1989 now U.S. Pat. No. 4,948,843.

FIELD OF THE INVENTION

This invention relates to the incorporation of organic dyes into inorganic oxides. More specifically, it relates to incorporation of dye-containing polymers into metal oxide polymers, such as silicic acid heteropolycondensates. In a preferred embodiment of this invention, an organic polymer having dye units pendant on the polymeric backbone is linked to a silicic acid heteropolycondensate through a group or groups that covalently bond the polymer to the heteropolycondensate. Preferably, the linking group or groups are bonded to the polymer backbone, although it is contemplated that the bonding can also take place through the dye units. The dye-containing polymers can be linked with the condensate by reaction of groups on the polymer with a suitable molecule such as a haloalkyltrialkoxysilane or an isocyanatoalkyltrialkoxysilane. Formation of the linking group along the polymer chain may be accomplished prior to bonding the polymer to the condensate. However, it is also contemplated that the linking group can be attached to the polymer while the polymer is being bonded to the condensate.

The polycondensate may contain one, or two or more types of metal oxide units. Thus for example, it may be solely composed of silicon oxide, or be a mixture of silicon oxide and titanium oxide units. Titanium oxide confers an enhanced index of refraction to products of this invention. Other metal oxide units which may occur in the heteropolycondensate are non-volatile oxides of Groups IIA to VA and IIB to VIB of the Periodic Table. Thus, the heteropolycondensate can be derived from oxides of the following elements, Mg, Ca, B, Al, Pb, P, As, Ti, Zn, V and the like. Group IA elements, such as Na or K, may also appear in the condensate.

BACKGROUND OF THE INVENTION

In optical, solar energy and similar devices, it is desirable to incorporate dyes into inorganic glasses. Organic dyes are far superior to inorganic dyes in many respects. For example, there is usually a greater intensity of light absorption, and an ability to more closely govern the area of the spectrum in which light absorption takes place. Furthermore, there are many more organic dyes to choose from. However there is a major difficulty that must be overcome for organic dyes to be incorporated into inorganic glasses; viz., the insolubility of organic dyes in the inorganic phase. In the art, this problem has not been satisfactorily overcome, especially for glasses to be employed in special high technology fields, such as those mentioned above. Hence even now, as at the advent of the glassmaking art, colored glasses are commonly made by incorporating colored inorganic oxides into silicate glass.

Recently, there have been attempts to solve the solubility problem by substituting thin plastic sheets for inorganic glasses, and incorporating organic dyes into the plastic. Results have been less than satisfactory, as discussed below.

When dyes are exposed to the light energy they are designed to absorb, they enter into an excited state. If the increase in energy is dissipated by electron transfer, the dyes can react with the plastic matrix in photochemically promoted reactions. This can cause the film to become opaque, or lose a significant physical property such as strength. Furthermore, the interaction can cause a change in the chemical composition of the dye with attendant loss of desired function.

Avnir et al, *Journal of Non-Crystalline Solids* 74 (1985) 395–406, suggested means to overcome the problems discussed above. They trapped certain organic dyes in silica and silica-titania thin films by the sol-gel technique. The sol-gel technique is a low temperature method for forming inorganic glasses; it involves hydrolysis and condensation reactions of a material such as tetramethoxysilane. In the process, the methoxy groups are hydrolyzed with water in the presence of an acid catalyst. The silanol groups,

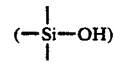

obtained by hydrolysis, condense to form

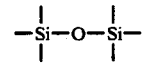

linkages. Through these linkages, three-dimensional inorganic networks result. In the Avnir system, such networks trap the organic dye. In other words, entrapment is used to overcome the inherent immiscibility of the organic material in the inorganic network.

Although the Avnir proposal would appear to overcome the age-old insolubility problem, it has not been widely adopted. The lack of wide use indicates that there are significant problems in the Avnir system. Specifically, it appears that the Avnir method does not prevent the microaggregation of dye molecules in the inorganic matrix. Aggregates can have light absorption maxima at different wavelengths than the monomeric dye; thus a different color results along with potentially lower stability. These differences in behavior can cause serious detrimental consequences in the photographic, optical and related arts.

Microspheres of dye aggregates in prior art compositions need not be present at the time that the systems are produced; instead they may form over time, as the prior art materials are exposed to use conditions. In prior art materials, the dye molecules are not permanently entrapped within the inorganic matrix. Instead, the molecules have some freedom to migrate. When two or more dye molecules come together through migration, they tend to form aggregate structures where optional properties depend on the specific stacking orientation and interplanar separation of the chromophores.

Furthermore, dye molecules within the interior of the microspheres may be shielded from light, and therefore unable to interact with the light. This causes a loss of function. Moreover, if the dye aggregates grow in size so that more and more dye molecules become shielded, a deleterious fading will take place over time. In sophisticated equipment, such fading is highly objectionable.

The present invention markedly departs from the teachings of Avnir et al. More specifically, in one embodiment, the present inventors provide compositions which comprise organic-modified metal oxide heteropolycondensates rather than the wholly inorganic condensates employed by Avnir et al. In another embodiment, the present inventors have provided improved compositions of wholly inorganic matrices. Moreover, in contrast to Avnir, the present inventors use dye-containing polymers rather than monomeric dyes. Furthermore, in applicants' compositions the dye-containing polymers are covalently linked to the heteropolycondensate network.

It is surprising that optically clear films can be made from the compositions of the invention. Until applicants' work, it would have been expected that the inorganic and organic components would form an opaque system, thereby rendering the compositions unsuitable for use in imaging, photographic, and/or solar energy and related arts. Thus it is believed that the present invention is a significant advance in the art.

SUMMARY OF THE INVENTION

In a preferred embodiment, this invention pertains to composite materials made by covalently linking a dye-containing polymer with a silicic acid heteropolycondensate that optionally contains organic groups bonded to silicon atoms via Si-C bonds. This invention also pertains to films and other articles made from the composites of this invention. In a third major aspect, this invention pertains to a process for making the composites. Preferred films of this invention have a thickness of from about 0.1 to about 3 microns. The composites of this invention are useful for making optically acceptable films.

Thus, the materials of this invention provide stable, hard coatings, lenses, and other articles with high optical clarity which can be used as filters or in other optical and imaging applications. The silica or other metal oxide content of the heteropolycondensate can be controlled to tailor make articles having desired properties.

The presence of the sol-gel provides protection for the dye. Also, the covalent linkages between the dye-polymer and between the polymer and the condensate help make more stable films, with reduced likelihood of dye loss due to leaching. To prevent leaching, the sol-gel matrix is sufficiently cured. This can be accomplished by a relatively quick heat treatment at elevated temperature.

The compositions of this invention comprise a dye-containing polymer covalently linked to an inorganic acid heteropolycondensate or an organic-modified metal oxide heteropolycondensate. The dye-containing polymer comprises a polymer backbone. Along the backbone are dye units covalently bonded thereto. In preferred embodiment, the backbone also has groups along the chain which bond the polymer to the heteropolycondensate. The polymer may also contain repeating units which are not bonded to a dye.

Thus, one type of dye-containing polymer used in this invention can be composed of three types of repeating units:

wherein A is a polymer unit having linking group L bonded to a dye, B is a polymer unit having a linking group L' bonded to a metal alkoxide or similar moiety that can bond to a metal oxide heteropolycondensate via hydrolysis and condensation, and C is a third type of polymer unit. R' is an alkyl or similar substituent or a hydrolyzable group such as a halogen; x is equal to v-(a+1) where v is the valence of the metal. As shown, C is not bonded to a dye unit or to a group which links the dye-containing polymer to the metal oxide heteropolycondensate.

The polymer backbone may be made by linking one or more A groups with one or more B groups and optionally one or more C groups. In the polymer, the A, B, and C groups can be uniformly or randomly situated.

The polymer contains a sufficient number of A units so that there is enough dye to perform the desired function. In general, the number of A units is such that the weight percent of dye constitutes at least about 1% by weight. There is no real upper limit on the amount of dye, this being defined by the use intended, the properties of the dye, and the solubility of the dye unit in the remainder of the system. In general, the concentration of dye in the polymer is less than about 80 weight percent.

The concentration of B units in the polymer is sufficient to give the desired number of linkages between the polymer and the organic-modified heteropolycondensate. Preferably, there is at least one covalent bond between each polymer chain or ring and the polycondensate. A plurality of linkages can be present. Thus, it is preferred that the mole percent of B units in the polymer of this invention be within the range of from about 1 to about 30 mole percent.

In the B units, M is a metal such as silicon, vanadium, titanium, zirconium, lead, aluminum, or one of the other metals mentioned above. Preferably the metal is silicon. As shown, the metal M is linked to a number of alkoxy groups represented by "a", wherein "a" is a whole number equal to less than the valence of the metal. For example, in one preferred embodiment when M is silicon, "a" is equal to 3. A skilled practitioner will surmise that the metal M need not be linked only to alkoxy groups as shown. Instead, other hydrolyzable groups such as halogen radicals may be bonded to the metal atom. In such a case, R' is a hydrolyzable group, x is equal to the number of R' groups present, and x=v-(a+1), as stated above.

When the hydrolyzable groups are alkoxy radicals, it is preferred that they be lower alkoxy radicals. Thus, it is preferred that R in the above formula (for B units) be selected from alkyl radicals of 1 to about 4 carbon atoms.

In the polymers of this invention L and L' may be alike, so long as they are capable of being linked to a dye unit and to $-MR'_x(OR)_a$ unit. Thus, for example, L and L' may contain an amino group $-NH_2$, which has sufficient nucleophilicity to react and form a bond to a dye unit and a $-MR'_x(OR)_a$ substituent.

The dye unit can be formed by reacting an ester linkage on a dye molecule or dye intermediate, with the —NH$_2$ group. An —M(OR)$_a$ unit can be attached by reacting a molecule having the formula XR$^1$M(OR)$_a$ with the —NH$_2$ group. In the reactant XR$^1$M(OR)$_a$, X is a halogen such as chlorine or bromine and M is a metal selected from the class of metals defined herein, "a" has the same significance as above, (one less than the valence of the metal) R is an alkyl radical having one to about four carbon atoms, and R$^1$ is an alkylene radical preferably having one to about six carbon atoms. As indicated above, other reactants, e.g., XR$^1$R'$_x$M(OR)$_a$ wherein each of the symbols in that formula have the same significance as above, can be used to prepare the composites of this invention.

A polymer with groups A, B and C can be made from a homopolymer. For example, a polymer having active primary amino groups —NH$_2$ can be prepared as a starting material. Some of the —NH$_2$ groups in the polymer can be reacted to form groups that are not reactive (e.g. polymer units represented by C above). A portion of the remaining groups can be reacted with the dye, or a dye intermediate, and all or some of the remainder subsequently reacted to bond with the linking group L'—MR'$_x$(OR)$_a$. Alternatively, the polymer can be made by a copolymerization of groups A and B, and optionally C groups.

As indicated above, C units are optional. They may be present for convenience, or because they confer some desired property such as strength, or miscibility on the dye-containing polymer.

A skilled practitioner will recognize that the presence of B groups is also optional. For example one may wish to use a polymer unit A which is bifunctional, i.e. it has a means for linking a dye molecule to the polymer backbone, and another linkage for covalently bonding the dye-containing polymer to the metal oxide heteropolycondensate.

DESCRIPTION OF PREFERRED EMBODIMENTS

In a prime aspect, this invention provides a composite comprising a dye-containing polymer covalently linked to a silicic acid heteropolycondensate which is optionally modified by the presence of organic groups bonded to a silicon atom. As stated above, the composites of this invention may contain other metals besides silicon.

To prepare composites of this invention, we use a polymer that has pendant active groups which can be reacted with a molecule to provide a linking unit through which the dye-containing polymer is linked to the heteropolycondensate. Below, we will describe the dye-containing polymers. Thereafter we will describe their modification to incorporate groups which will link the polymers to the heteropolycondensate network. We will then describe a preparation of the network and the covalent bonding of the dye-containing polymer to the network.

(A) Dye-Containing Polymers

In a particular embodiment of this invention, the dye polymers are prepared by polymerizing monomers having sites capable of reacting with a dye intermediate. After polymerization, the backbone is reacted with a first dye intermediate to covalently bond the dye intermediate to the backbone. Then, the resulting backbone/dye intermediate compound is reacted with a second dye intermediate that covalently bonds to the first dye intermediate to form a dye covalently bonded to the polymer backbone. The dye polymer may also be obtained by reacting a finished dye with the polymer. In other words for this invention it is not necessary to build the dye on the polymer backbone. Instead, a complete dye or chromophore can be reacted to bond with the polymer.

The polymer backbone can be any of a number of known polymer backbones. It may be a randomly coiled backbone, such as poly(2-aminoethyl methacrylate), poly(3-aminopropyl methacrylamide), or copolymers thereof. It may also be a helically coiled backbone as is found in polyaminoacids, such as poly(l-ornithine, and other polymers described in, for example, H. Law, *The Organic Chemistry of Peptides*, 1950. J. Wiley & Sons,; G. Fasman, *Poly a-amino Acids*, 1967, Marcel Dekker, Inc.; G. Zubay, *Biochemistry*, 1983, Addison Wesley Publ. Co.; E. Selegny, *Optically Active Polymers*, 1979, D. Reidel Publishing; or R. B. Martin, *Introduction to Biophysical Chemistry*, 1964, McGraw Hill, Inc. The size of the polymer backbone is preferably from 10 to 10,000 repeat units. The exact conformation of the coiled polymer backbone will depend on the dye that is to be bonded thereto.

The present invention is not limited to any class of dyes. However certain types of dyes such as the indole and benzimidazole carbocyanine dyes are preferred. In general, one uses a dye that has (a) the desired ability to interact with light, (b) an ability to be attached to the polymer backbone, and (c) the requisite solubility or miscibility with the remainder of the system so that optically clear products can be produced.

The dye units of the dye polymers employed in this invention can be selected from a wide variety of dyes including cyanine dyes. Thus, a class of dyes suitable for use in this invention has the formula:

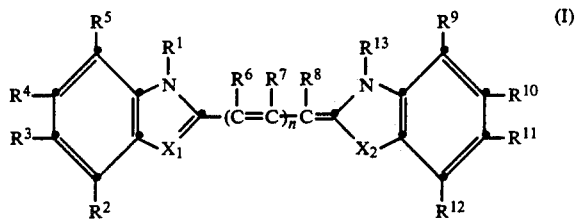

In this formula, R$^1$-R$^{13}$ can be independently selected from known substituents for such groups. These substituents include hydrogen, alkyl of one to about six carbon atoms such as methyl or ethyl, aryl of from 6 to about 20 carbon atoms such as phenyl, halogen such as chloro, alkoxy of 1 to about 15 carbon atoms such as methoxy, ethoxy, as well as sulfo, carboxyl, and other substituents. Of these substituents, certain are preferred. For example, it is preferred that R$^6$, R$^7$, and R$^8$ be hydrogen. It is also preferred that R$^2$-R$^5$ and R$^9$-R$^{12}$ be unsubstituted alkyl or aryl, i.e., groups that are solely composed of carbon and hydrogen. It is to be understood that pairs of substituents on the saturated aromatic rings, e.g., two of R$^2$-R$^5$, and/or R$^9$-R$^{12}$ may be connected in order to form a fused ring system, which may be aromatic in nature, e.g., a benzindole nucleus. Other applicable substituents which may appear on the ring(s) include halogen, —SO$_3$H, —NH$_2$, —NO$_2$, —CN, acyloxy, alkoxy groups, and the like. Preferably the acyloxy and alkoxy groups have one to about four carbon atoms In formula (I), ring member X$_1$ may be

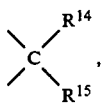

in which case, the chromophore on the left of the methine bridge is an indole nucleus. Alternatively, ring member $X_1'$ may be

in which case the chromophore is a benzimidazole nucleus.

The substituents $R^{13}$ and $R^{14}$ are selected from the same substituents as $R^1$-$R^{12}$. More preferably, $R^{13}$ and $R^{14}$ are unsubstituted alkyl groups of up to about six carbon atoms, such as methyl ethyl, isopropyl, sec-butyl, isbutyl, and the like.

The chromophore on the left hand of the methine bridge is bonded to the polymer backbone through group $R^1$, and preferably a linking group which is attached to $R^1$ and to the polymer backbone.

Ring member $X_2$ may be selected from

in which case, the chromophore on the right of the methine bridge is an indole nucleus. Alternatively, ring member $X_2'$ may be

in which case the right-hand chromophore is a benzimidazole nucleus. Ring member $X_2$ may also be a chalcogen, e.g., O, S, Se, or Te, in which case the right-hand chromophore is a benzoxazole, benzthiazole, benzselenazole, or benztellurazole group respectively.

In light of the above, it is to be understood that dyes of Formula I can be symmetrical or unsymmetrical. Accordingly, there are four main types of Formula (I) dyes useful in this invention. They are set forth in the table below.

TABLE 1

| Cyanine Dye Type | Chromophore Bonded to Polymer Through a Linking Group | Methine Type Bridge | Other Chromophore |
|---|---|---|---|
| 1 | Indole | Yes | Indole |
| 2 | Indole | Yes | Benzimidazole |
| 3 | Benzimidazole | Yes | Indole |
| 4 | Benzimidazole | Yes | Benzimidazole |

As described above, Type 4 dyes have certain analogous species, viz those mentioned above wherein $X_2$ is selected from the class consisting of O, S, Se, and Te.

Some dyes which have a benzimidazole chromophore on both sides of the methine bridge (Polymer type 4) have a greater tendency to aggregate than other dyes described above. Hence, when it is desired to make products of this invention in which a dye is aggregated, one may select a dye of Type 4.

The chemistry of cyanine and related dyes, including methods of making them, is described by Weissberger and Taylor, *Special Topics of Heterocyclic Chemistry*, John Wiley and Sons, New York, 1977, Chapter VIII; Venkataraman, The Chemistry of Synthetic Dyes, Academic Press, New York, 1971, Chapter V; James, supra, Chapter 8, and F. M. Hamer, *Cyanine Dyes and Related Compounds*, John Wiley and Sons, New York, 1964. Useful sensitizing dyes include the benzimidazole dyes disclosed in UK Patent 742,112, Brooker U.S. Pat. Nos. 1,846,300; '301; '302; '303; '304; 2,078,233; and 2,089,729; Brooder et al U.S. Pat. Nos. 2,165,338; 2,213,238; and 2,493,747; '748; 2,526,632; 2,739,964 (Reissue 24,292); 2,778,823; 2,917,516; 3,352,857; 3,411,916; and 3,431,111; Sprague U.S. Pat. No. 3,503,776; Nys et al U.S. Pat. No. 3,282,933; Riester U.S. Pat. No. 3,660,102; Kampfer et al U.S. Pat. No. 3,660,103; Taber et al U.S. Pat. Nos. 3,335,010; 3,352,680; and 3,384,486; Lincoln et al U.S. Pat. No. 4,397,981; Fumia et al U.S. Pat. Nos. 3,482,978; and 3,623,881; Spence et al U.S. Pat. No. 3,718,470; and Mee U.S. Pat. No. 4,025,349.

The dye is covalently bonded to the polymer backbone through any atoms capable of forming such bonds. This bonding may be direct or through any known linking group. It is within the skill of the art to determine the optimum bonding configuration of a particular dye molecule and polymer backbone. Generally, the strongest covalent bonds between the dye and the polymer backbone will be formed through a heteroatom, such as the nitrogen atom of a benzimidazole nucleus of the dye.

The optimum amount of dye covalently bonded to the polymer backbone will vary according to the polymer backbone, the dye, and the desired performance characteristics of the photographic or optic element in which they are being used. One skilled in the art can easily determine the optimum amount of dye for a specific purpose by simple experimental techniques using varying amounts of dye.

In a preferred embodiment of the invention, the dye polymers described above comprise repeating units of the formula:

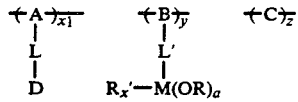

wherein A and B each independently represents polymerized monomers, C is one or more other polymerized monomers, L and L' are linking groups of 4 to 15 carbon atoms, D is one or more dyes, $x_1$ represents a mole percent of 1 to 80%, y represents a mole percent of 5 to 20%, and z represents a mole percent of 0 to 94%.

The polymer backbone repeat units useful as -A-, -B-, and -C- can be any units derived from monomers capable of addition polymerization. Such monomers include amino acids, such as lysine, proline and ornithine, or ethylenically unsaturated monomers, such as acrylic and methacrylic acid esters (e.g., methyl methacrylate, methyl acrylate, ethyl methacrylate, n-butyl acrylate, 2-ethylhexyl methacrylate, 2-hydroxyethyl methacrylate, 2-hydroxyethyl acrylate, ethylene dimethacrylate, methacrylamide, acrylamide, methyl acrylamide, methyl methacrylamide, acrylonitrile, and the like), styrene and styrene derivatives (e.g., vinyl toluene, vinylbenzene, divinylbenzene, 4-t-butylstyrene, 2-chloromethylstyrene, and the like), vinyl ethers, vinyl esters, and maleic anhydride. The -A- unit is preferably a polymerized monomer that has a pendant amino or hydroxyl group for linking with the dye D. Such monomers having pendant amino groups include lysine, vinyl amine, 2-aminoethyl methacrylate, and 3-aminopropylmethacrylamide, and the like. Thus for example, the repeat unit can be of any type which has a pendant amine group of sufficient nucleophilic character to react with an ester.

The linking groups, L, and L' can be any known linking group, such as substituted or unsubstituted alkyl, substituted or unsubstituted aryl, or substituted or unsubstituted alkenyl, preferably of from 4 to 15 carbon atoms. In a preferred embodiment, -L- is represented by the formula $-R_5-L''-R_6-$. In this formula $R_5$ and $R_6$ are each independently substituted or unsubstituted alkyl of from 1 to 10 carbon atoms. L'' is a linking group resulting from (i) a substitution reaction (e.g., utilizing a nucleophile such as amino, hydroxy, alkoxy, alkylthio, and the like), (ii) an addition reaction (e.g., a Michael addition such as a reaction between an activated unsaturated group such as a vinyl sulfonyl or acryloyl with an active methylene group such as $-CO-CH_2-CO-CH_3$ or $-CO-CH_2-CN$), or (iii) a condensation reaction (e.g., the reaction of an amine or alcohol with a carboxylic acid or ester). These reactions may be between hydroxy compounds or amines, and isocyanates, carboxylic acids, carboxylic acid esters, carboxylic acid halides, carboxylic acid anhydrides, sulfonic acids, sulfonic acid esters, or sulfonic acid halides. Examples of L'' linkages include an ester (e.g., $-(CH_2)_2-CO_2-(CH_2)_2-$), amido
(e.g., $-(CH_2)_3-CO-NH-(CH_2)_2-$), imido
(e.g., $-(CH_2)_4-N=CH-(CH_2)_4-$), urethane
(e.g., $-(CH_2)_5-O-CO-NH-(CH_2)_5-$), sulfonamido
(e.g., $-(CH_2)_3-SO_2-NH-(CH_2)_3-$), or carbonate
(e.g., $-(CH_2)_2-O-CO-O-(CH_2)_4-$).

The dye D, can be any dye. Preferably it is the type described above. In a preferred embodiment, -D is represented by the formula -D'-D'', where D' is a benzimidazole dye intermediate capable of bonding with a side chain of the polymer backbone to form the linking group L and D'' is a indole dye intermediate capable of bonding to D'. Examples of -D' include:

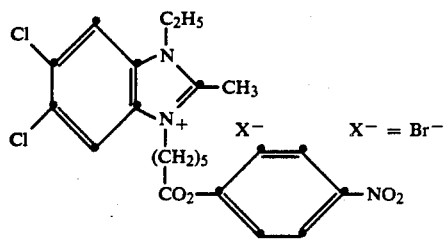

Examples of -D'' include:

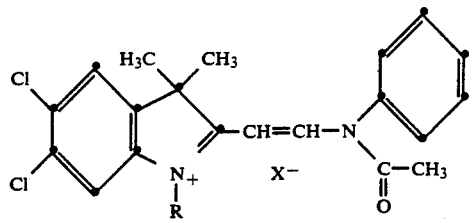

where $X^-$ is $I^-$, $Br^-$, or p-toluene sulfonate and R is methyl, ethyl, and the straight and branched chain propyl, butyl, pentyl, hexyl, heptyl, nonyl, and decyl groups, $-(CH_2-N^+(C_2H_5)_3Br^-$, and the like. Additional examples of such dye intermediates and how they are incorporated in the dye polymer are shown in the Examples below.

In one embodiment, dye polymers useful in this invention can be prepared by:

(1) treating an indole or benzimidazole-containing dye intermediate having an active site with an alkylating agent having a substituent capable of undergoing a condensation, substitution or addition reaction, or having a group capable, upon activation, of undergoing a condensation, substitution, or addition reaction, to generate a quaternary ammonium salt intermediate, (2) activating, if necessary, and linking this quaternary ammonium salt intermediate with a polymer having a complementary group that will undergo a substitution, addition, or condensation reaction with the intermediate of step (1), (3) reacting the polymer of step 2 with a indole or benzimidazole-containing dye intermediate capable of bonding to the dye intermediate of step (1) to form a dye unit.

The active site on the heterocyclic compound of step (1) is preferably a heterocyclic nitrogen. The group capable of activation in step (1) is preferably an acid group, which can be activated to an acid halide or a nitrophenyl ester as described in S. Sakibara & N. Inukai, *Bull. Chem. Soc. Japan*, 37, 1231 (1964). The quaternary ammonium salt intermediate from step 1, then, has two active or activatable sites. One is the 2-methyl group on the heterocyclic ring and the other is an activated ester on the side chain attached to the heterocyclic nitrogen or an activatable (as described above) carboxylic acid on the side chain attached to the heterocyclic nitrogen. Thus, the activation in step 2 is necessary if the quaternary ammonium salt intermediate has an acid group in the side chain attached to the heterocyclic nitrogen. The complementary group of step 2 is preferably hydroxy, mercapto, or an amine group. The dye intermediate of step (3) preferably contains an acetanilidovinyl group on its heterocyclic nucleus to condense with an active methylene group on the dye intermediate of step one to form a methine chain linking the two heterocyclic nuclei.

In an alternative embodiment, the dye unit containing the two indole or benzimidazole nuclei and having, on one of the nuclei, a substituent capable of undergoing a condensation, substitution or addition reaction, or having a group capable, upon activation, of undergoing a condensation, substitution, or addition reaction, can be formed first. This dye unit may then be reacted with a polymer having a complementary group that will undergo a substitution, addition, or condensation reaction with the active or activatable group on this dye unit.

An example of the reaction scheme used to prepare a typical dye polymer useful in the invention is shown in the Examples below. The dye polymers can be further reacted to add an

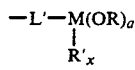

group as illustrated by the Examples.

EXAMPLE 1

Step 1

Preparation of Dye-Polymer 1 having the formula:

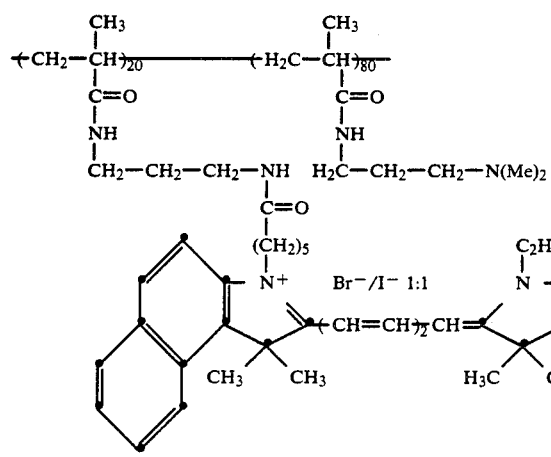

A solution 89.1 g, of polymer intermediate PI-I, prepared as set forth in Example 6, was used as a starting material. The solvent was DMSO (dimethylsulfoxide), and the concentration of PI-I was 0.01 molar based on amine hydrochloride. The solution plus reactant A (5.76 g, 0.011 moles) were combined and stirred at 20° C. for 2 hours. The reaction mixture was then heated at 120° C. for 30 minutes followed by addition of B (5.86 g, 0.011 moles). Heating was continued 1 hour, after which the reaction was allowed to stand overnight at 20° C. It was then treated with HBr/acetic acid (30%, 10 ml) and the dye-polymer was precipitated in diethyl ether (1.2 liters). The oily solid was triturated briefly, the solvent was decanted and acetone (1.2 liters) was added. The trituration was repeated with acetone, the solid filtered, washed with acetone and ether, and the product was air dried.

| Weight | 18.8 g |
|---|---|
| absorbance | 680,630 nm (CH$_3$OH) |

Reactant (A) and (B) had the following formulas:

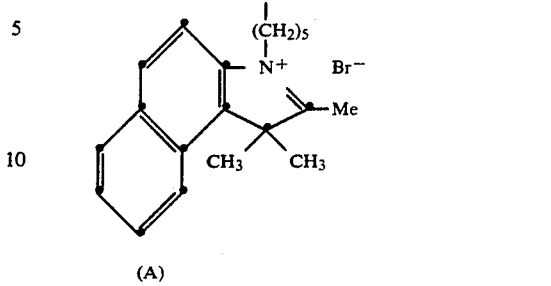

(A)

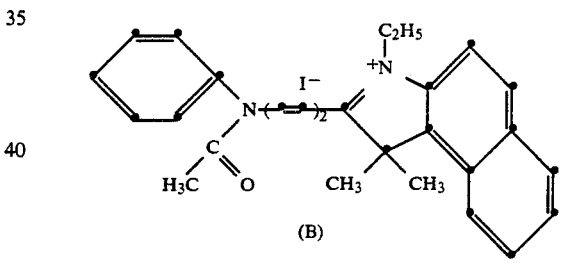

(B)

EXAMPLE 2

Reactant (A) was prepared by reacting 6-bromo-hexanoic acid p-nitrophenyl ester with 1,1,2-trimethylbenzindole according to the following procedure:

A 37 g portion (0.11 mole) of 6-bromohexanoic acid p-nitrophenyl ester and 20 grams (0.095 mole) of 1,1,2-trimethylbenzindole combined in a 200 ml beaker, and the solution was heated at 90° C. for 15 hours in a vacuum oven with no stirring. An nmr of the dark paste indicated approximately 90% conversion. The product was cooled and poured into a plastic tray where it solidified. The solid was treated with heptane, decanted, and broken up using a mortar and pestle. The resultant powder was then treated with fresh heptane and filtered. The solid was washed with ether and ligroin and dried in vacuo: wt. 50 g, 98%. The nmr spectrum (CDCl$_3$) was consistent with the product quaternary salt structure (Reactant A).

EXAMPLE 3

This example illustrates the formation of an indole analog of the reactant whose preparation was illustrated by the previous example. The product of this example,

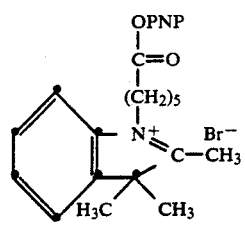

can be employed like the product of Example 2, i.e., in the preparation of dye-polymers for use in this invention.

A 32 g portion (0.10 mole) of 6-bromohexanoic acid p-nitrophenyl ester was combined with 16 g (0.10 mole) of 1,1,2-trimethylindole in a brown bottle and heated overnight in a vacuum oven at 90° C. The solid was cooled, triturated with ether, and the solvent was decanted. Acetone (50 ml) was added and the mixture was allowed to stand for two hours at 20° C. The solid was filtered, washed with acetone and ether, and dried in vacuo: wt. 34 g, 71%. The nmr (CF3COOH) spectrum was consistent with the quaternary salt structure.

Example 1 illustrates the formation of a dye-polymer of this invention. Example 4, which follows, illustrates the formation of polymers with dyes of Type 4 (see Table 1) which may have a greater tendency to aggregate than other dyes employed in this invention.

EXAMPLE 4

Preparation of Dye-Polymer 2

Step 1

Preparation of Intermediate A

Caprolactone (11.9 g) was added portion wise to a stirred neat solution of iodotrimethylsilane (21.0 g). After complete addition, the mixture was stirred for another 10 minutes. 1-Ethyl-2-methyl-5,6-dichlorobenzimidazole (23.0 g) was added to the mixture in a single portion. The mixture was then heated over a steam bath for 60 hours under a drying tube. The solid cake that formed was taken up in methanol with heating and the homogeneous solution was allowed to cool slightly and poured into anhydrous ether with precipitation. The precipitate was collected by filtration, dried, and recrystallized from CH3CN to yield 3-(5-carboxypentyl)-5,6-dichloro-1-ethyl-3-methylbenzimidazolium iodide (intermediate A). The structure was confirmed with mass spectral, $^1$H NMR, and infrared spectral analysis.

Step 2

Preparation of Intermediate B

Intermediate A (0.5 g) was dissolved in 5 ml pyridine at room temperature. To this solution was added p-nitrophenyl trifluoroacetate (1.0 g) in a single portion as a melt. The solution was stirred for 1 hour at room temperature and then diluted to 5 times the volume with toluene. The solid precipitate that formed was filtered, washed with toluene, and dried in vacuo to yield 5,6-dichloro-1-ethyl-2-methyl-3-[5-(p-nitrophenyloxycarbonyl)]-pentylbenzimidazolium iodide-co-trifluroacetate (intermediate B).

Step 3

Preparation of Intermediate C

Crude intermediate B (0.65 g) was dissolved in 4.5 ml dimethyl sulfoxide and added to a solution of poly-l-lysine hydrochloride (150 mg) in dimethyl sulfoxide (4 ml) and triethylamine (0.48 ml) at room temperature. The solution was stirred for 1 hour, at which time an additional amount of poly-l-lysine.HCl (0.38 g) in dimethyl sulfoxide (0.2 ml) was added. The mixture was stirred for 18 hours to form a reaction mixture containing intermediate C.

Step 4

Preparation of Dye-Polymer 2

2-(2-Acetanilidovinyl)-5,6-dichloro-1,3-diethylbenzimidazolium iodide (0.68 g) was dissolved in the reaction mixture from step 3 with brief swirling at 60° C. Upon cooling, tetramethylguanidine (0.4 ml) was added. The deep red solution was stirred for 3 hours, at which time dye-polymer 1 was precipitated by pouring the mixture into methanol. Filtration and drying yielded DP-1 (λ-max=580 nm in a 1:20 mixture of dimethylformamide and methanol).

EXAMPLE 5

Preparation of Dye-Polymer 3

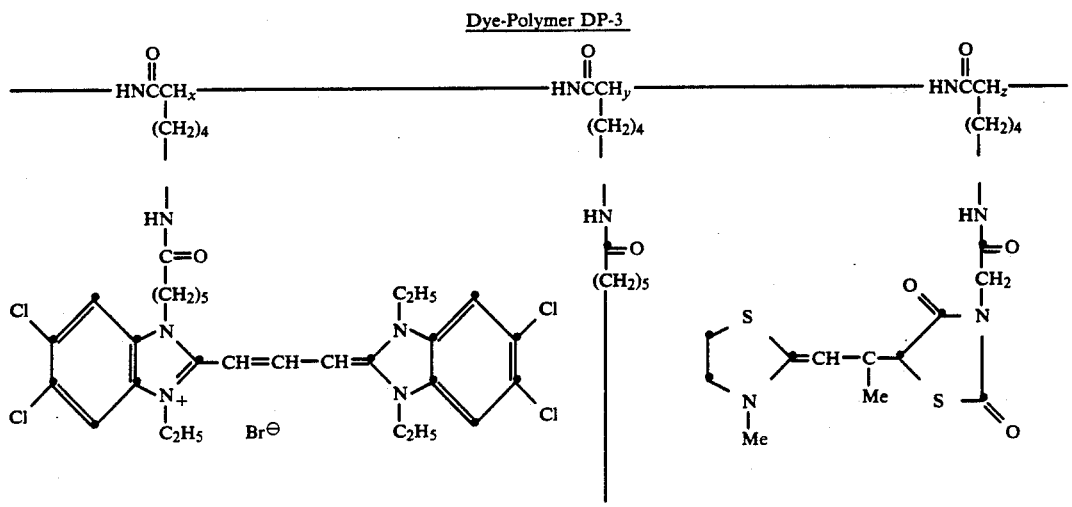

Dye-Polymer DP-3

-continued

Dye-Polymer DP-3

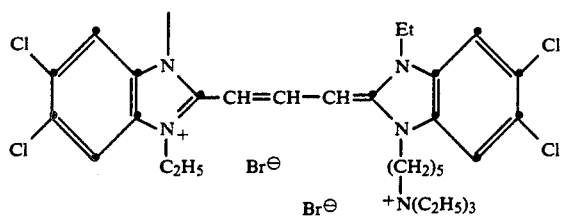

Step 1
Preparation of Intermediate D

Trifluoroacetic anhydride (84 ml, 0.6 mol) was added to a suspension of p-nitrophenol (56 g, 0.4 mol) in toluene (120 ml) in one portion. The mixture was heated at reflux for 5 hours at which time the p-nitrophenol had fully dissolved. The solvent was then removed by distillation at 20 mm, 40°-50° C. and the yellow residual oil (which contained some toluene) was transferred to a brown bottle flushed with dry $N_2$. This oil was used directly without further purification; yield 110 g; IR spectrum in agreement with the expected structure, p-nitrophenyl trifluoroacetate.

A merocyanine dye (500 mg, 1.5 mmol) of the formula:

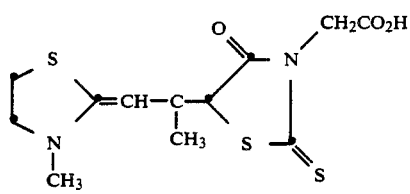

was dissolved in pyridine (50 ml), followed by the addition of p-nitrophenyl trifluoroacetate (0.8 of the oil described above). The orange-red solution was stirred overnight. Another aliquot of p-nitrophenyl trifluoroacetate (0.4 ml) was added and the reaction mixture was stirred an additional 3 hours. The solvent was removed at 2 mm, 30°-40° C. The product was precipitated with toluene/ethanol 1:1, filtered, washed with toluene, and dried in vacuo. Yield, 620 mg, 97%, m.p. 211°-213° C., λ-max 492 nm (MeOH, trace cresol), IR and mass spectrograms in agreement with the expected structure:

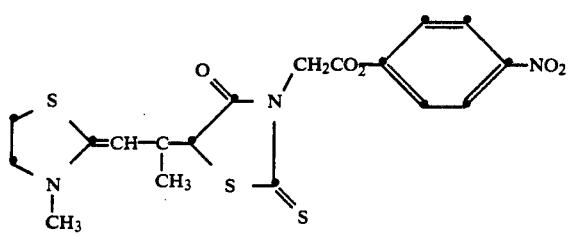

Intermediate D

Step 2
Preparation of Intemediate E

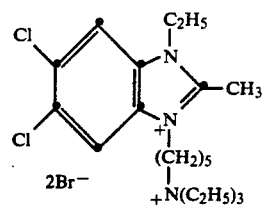

Intermediate E 3-(5-Carboxypentyl)-5,6-dichloro-1-ethyl-2-methyl-benzimidazolium iodide (0.50 g, 1.1 mmol) was dissolved in 5 ml pyridine at ambient temperature. To this solution was added p-nitrophenyl trifluoroacetate (1 g, 4 eq., 4.2 mmol) in a single portion as a melt. The solution was stirred 1 hour at ambient temperature and then diluted to 5 times the volume with toluene. The solid precipitate was filtered, washed with toluene and dried in vacuo to give a white solid (0.65 g, 85% yield, m.p. 132°-134° C.). The solid was used without further purification.

Step 3
Preparation of Intermediate F

A compound of the formula:

(40 g, 68 mmol), methoxyethanol (28 ml) and ethylisoformanilide (24 ml) were combined and heated 1 hour at 120° C. The solution became red orange. Another aliquot of ethylisoformanilide (24 ml) was added. No change in the NMR (90 MHz) spectrum could be detected by the additional amount of ethylisoformanilide. The product was oiled out in diethyl ether ($Et_2O$) (1 L). The solvent was decanted, followed by the addition of 1,2-dimethoxyethane (1 L) and $H_2O$ (5 ml). The solid product was filtered, washed with $Et_2O$ and dried in vacuo; yield 48 g, yellow-orange solid.

This solid (10 g, 14.6 mmol) was combined with pyridine (35 ml) and $Ac_2O$ (5 ml). The mixture was heated 1 hour at 60° C. Acetic acid anhydride ($Ac_2O$) (10 ml)

was added. The reaction was stirred briefly, cooled, and poured into 1 L acetone. The product slowly crystallized overnight in the refrigerator. The solid was filtered, washed with Et₂O, and dried in vacuo; yield 8 g, 76% pale pink solid. The NMR spectrum was in accord with the expected structure for intermediate F:

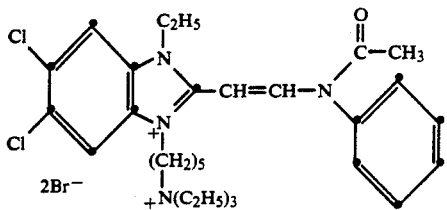

Step 4

Preparation of Dye-Polymer 3

Poly-l-lysine.HCl (MW about 50,000; 1.0 g, 6.1 mmol) was dissolved in 20 ml dimethyl sulfoxide. Intermediate E (3.5 g, 0.98 eq.) and Intermediate D (50 mg, 0.015 eq.) were added, followed by Et₃N (2.5 ml, 3 eq.). The yellow-orange solution was stirred at ambient temperature for 1 hour. Another 10 ml dimethyl sulfoxide was added to the reaction followed by the combination of Intermediate F (2.76 g, 3.8 mmol) and 2-(2-acetanilidovinyl)-5,6-dichloro-1,3-diethylbenzimidazolium iodide (1.27 g, 2.4 mmol). Not all the solid would dissolve until addition of tetramethylguanidine (2.1 ml, 3 eq.) upon which a deep red color formed within minutes. The reaction mixture was stirred 2 hours at which time the dye-polymer was precipitated in Et₂O (1 L). The solvent was decanted followed by the addition of acetone (500 ml). The red solid was stirred 10 min and filtered. After washing the product with additional acetone, it was air-dried and subsequently stored at 0° C.; yield 5.7 g, λ-max 545, 580 (H₂O/MeOH).

EXAMPLE 5

Preparation of Dye-Polmer 4

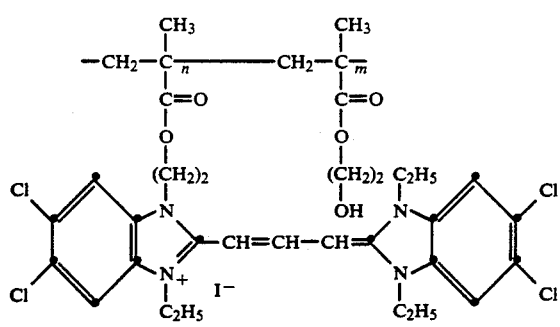

(n:m = 1:1)

Dye-polymer 4 (DP-4) was prepared in a similar manner to DP-2 except that poly(aminoethyl methacrylate-co-hydroxyethyl acrylate) (1:1 mole ratio) prepared in dimethylsulfoxide was used instead of poly-l-lysine.HCl.

As apparent from the discussion above, a preferred embodiment of this invention comprises use of a polymer which as a dye or chromophore bonded to a polymer backbone, and pendant amino groups also bonded to the backbone. These starting materials can be prepared by several routes. For example, a polymerizable compound containing an amine function such as an unsaturated amine can be copolymerized with a polymerizable unsaturated dye or dye precursor. In addition, a precursor of an unsaturated amine can be reacted with an unsaturated amine containing dye. Also, an unsaturated amine precursor can be reacted with an unsaturated amine precursor and the polymer thereby produced further processed to give the desired polymer. An alternate procedure is to react a preformed polymer backbone with reactants which will attach amine groups and dye moieties to the backbone. Furthermore, an amine containing polymer, i.e. a polymer having amino groups bonded to the backbone can be reacted to attach dye molecules to a portion of the amino groups. In the first two methods, a practitioner will generally conduct the process using free radical catalysis. Of the four routes the latter is most preferred since one can use a polymer having a desired molecular weight and thereby control the size of the polymer in an efficacious manner, and it is generally easier to make a polymer having amino groups than add the amino function after the polymer is made. When a polymer or copolymer containing amino groups is reacted to append dye functionalities to the backbone, the process can be conducted in any convenient manner. For example, the dye can have halide, sulfonyl halide, or methyl halide groups in which the halogen is active enough to react with an amino group. As appreciated by a skilled practitioner, one can also use a coupling reaction in which an active leaving group is bonded to an aromatic ring in the dye molecule. When using this expedient, the leaving group is displaced by the amino function.

(B) Modification of the Dye-Containing Polymer

In order to be suitable for use in this invention, the dye-containing polymers are modified to contain a moiety which will provide a linking group that will covalently bond the polymer to the heteropolycondensate. The nature of the moiety selected will depend on the groups available for bonding along the polymer chain. For example, if the polymer has amino groups pendant thereto, then one can react the polymer with a silane that has a halo group capable of reacting with an amino group to split out a hydrogen halide by-product, and form a nitrogen-carbon bond thereby attaching a unit capable of reacting with the heteropolycondensate. As another example, if the polymer has pendant hydroxy groups, a practitioner can react the polymer with a silane having an isocyanate group so that the silicon-containing moiety is linked to the polymer through a urethane linkage. It is within the skill of the art for a practitioner to select the type of silane to react with the active sites within the dye-containing polymer. Other examples of reactive groups within the silane which can be used to provide a linking group within the dye-containing polymer will be clear from the table below.

TABLE 2

| Dye Polymer Moiety | Silane Coupling Agents |
| --- | --- |
| (1) —NR₂ (R = H or alkyl or aryl) | Cl(CH₂)₃Si(OCH₃)₃ |
|  | OCN(CH₂)₃Si(OCH₃)₃ |

TABLE 2-continued

| Dye Polymer Moiety | Silane Coupling Agents |
|---|---|
| | 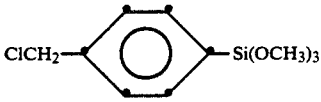 |
| | 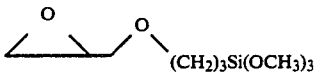 |
| (2) —OH | Cl(CH$_2$)$_3$Si(OCH$_3$)$_3$ |
| |  |
| | 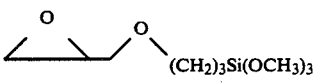 |
| (3) $-\overset{O}{\underset{\|}{C}}-OH$ or $-\overset{O}{\underset{\|}{C}}-Cl$ | OCN(CH$_2$)$_3$Si(OCH$_3$)$_3$<br>H$_2$N(CH$_2$)$_3$Si(OCH$_3$)$_3$ |
| | 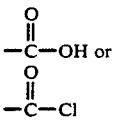 |
| (4) —SH | H$_2$NCH$_2$CH$_2$CH$_2$NH(CH$_2$)$_3$Si(OCH$_3$)$_3$<br>Cl(CH$_2$)$_3$Si(OCH$_3$)$_3$<br>Cl(CH$_2$)$_3$Si(OCH$_3$)$_3$ |

Also, it is suggested that coupling may also be achieved by direct reaction of functional groups such as —OH or —NH$_2$ on the polymer with halosilanes such as ClSi(OCH$_3$)$_3$. Such a reaction will produce silicon-oxygen-carbon or silicon-nitrogen linkages. Such linkages may be hydrolytically unstable. Therefore, polymers having those linkages should be employed in applications where hydrolytic stability is not a problem, or where it is advantageous.

The silane selected to provide a linking group to the polymer may have from one to three groups which react with active sites within the polymer molecule. If the silane has a plurality of such groups, then it will be capable of bonding two or three dye polymer molecules to the organic-modified silane heteropolycondensate. Preferably the silane has one or two such groups for reacting with active sites in the polymer; more preferably one.

As a further illustration of the modification of dye-containing polymers to render them reactive with a heteropolycondensate, consider a dye-containing polymer having pendant dye and amino groups along the polymer chain. Such a material can be made treating a polylysine according to the procedures illustrated by examples which follow below. Thereafter, the dye-containing polymer can be reacted with a compound such as chloropropyltrimethoxysilane. In this reaction, chloride radicals in the silane will react with pendant amino groups, and hydrogen chloride will be formed as a by-product. The desired product will be a polymer having trimethoxysilyl groups bonded to polymeric backbones. This intermediate can be reacted with tetramethoxysilane in the presence of water, and optionally an acid or basic catalyst. In this system, the tetramethoxysilane will react to form an organic-modified silicic acid heteropolycondensate. The methoxy groups within the methoxysilane radicals on the polymer will also participate in the hydrolysis/condensation that takes place; and consequently, there will be bonds formed between the heteropolycondensate and the organic polymer (through the linking groups formed from the pendant silyl groups).

It is to be understood that the modification of dye-containing polymers for use in this invention is not limited by the above illustration. Thus, for example, it is not necessary to limit the modification to dye-containing polymers which have pendant amino groups attached to the chain. One can react a haloalkyltrialkoxysilane with amino groups that are within the dye molecules bonded to the polymeric backbone. When using this expedient, it is preferred that attached group does not alter the reaction of the dye with light energy in a manner which renders the dye inoperative. Generally speaking, it is preferred to attach the moiety with the linking group directly to the polymer, rather than to the dye, because there are usually more reactive groups attached to the polymer backbone than dye molecules.

Moreover, one need not attach the linking group only to amino groups. Referring now to Table 2 above, if the polymer contains a pendant linkage set forth in the left hand column of the Table, then a silane (such as one containing three alkoxy groups) can have a group containing the corresponding radical in the right hand column of the Table.

Attachment of the moiety containing the linking group, is generally conducted in the presence of an inert organic solvent such as an alcohol. In a preferred embodiment, the solvent corresponds to the alkoxy groups in the silane. For example, if a practitioner is using a haloalkyltrimethoxysilane, then a preferred solvent would be methanol. Attachment of the moiety with the linking group is normally conducted at a mild temperature which gives a reasonable rate of reaction, but is not so high as to cause an undesirable amount of decomposition. The process is generally conducted at atmospheric pressure; however, lower and higher pressures can be used. The reaction can be conducted under a blanket of inert gas, such as argon, nitrogen, and the like. In many instances, the reaction is enhanced by agitation of the reaction medium by stirring or similar technique. The reaction time is not a truly independent variable, but is dependent at least to some extent on the inherent reactivity of the reactants, the reaction temperature, etc. In general, the reaction is usually reasonably complete in from about six to about 24 hours.

Thus, in a process for preparing a polymer having appended -L'-MR'$_x$(OR)$_a$ groups, by reacting a dye-containing polymer having an active substituent which can react with a metal containing compound having the formula X-R$^1$R'$_x$M(OR)$_a$, or, in one embodiment the formula XM(OR)$_a$, suitable reaction conditions are generally within the following ranges:

(i) temperature, from about $-20°$ to about $+130°$ C.; more preferably from 0° to 65° C.

(ii) pressure, 0.5 to 1.5 atmospheres; preferably, ambient pressure, i.e. 1 atmosphere.

(iii) time, 1 minute to 24 hours; more preferably, six to 24 hours, using a temperature within the range given above.

This invention is not limited by the molecular weight of the modified dye-containing polymer. In other words, the modified polymers employed in this invention can be selected from polymers having a wide molecular weight range. One selects a polymer which has the requisite number of dye units, linking groups to bond to the polycondensate, solubility, strength, etc. and/or other property or properties for the utility intended.

(C) Preparation of Composites

To prepare the composites of this invention, a dye-containing polymer modified as discussed above, is reacted with the source of the metal heteropolycondensate and a stoichiometric or substantially stoichiometric amount of water. As set forth above, the dye-polymer has the group $-L^1-M^1R'_x(OR)_a$ which participates in the condensation reaction to bind the dye-polymer to the condensate. The source of the polycondensate to which the dye polymer becomes bonded is one (or more) metal compounds having the formula $R^2_nM^2X_b$. In these structural formulas, $M^1$ and $M^2$ are metals, either alike or different, and selected from the classes of metals set forth above; i.e. Groups IA to VA inclusive, and IIB—VIB inclusive, of the Periodic Table. Each radical indicated by R and $R^2$ is alike or different and selected from alkyl radicals having one to about four carbon atoms. The value of "n" is preferably 0, 1, or 2 and "b" is equal to the valence of $M^2$ minus the value of n. X is a hydrolyzable group.

In a preferred embodiment, the metals $M^1$ and $M^2$ are silicon. Mixtures of metal compounds can be used, such as mixture of compounds of silicon and titanium. This invention is not limited to binary mixtures; mixtures of three or more metal compounds can be used. When mixtures are employed, it is preferred that at least 50 mole percent of the polycondensate produced be silicon oxide.

It is preferred that the metal compound or compounds be selected from metal halides and metal alkoxides. The alkoxides are preferred. Preferably each alkoxide radical is the same and selected from alkoxides having from 1 to about 4 carbon atoms. Methoxides and ethoxides are highly preferred. Examples of preferred alkoxides are $Si(OCH_3)_4$, $Si(OC_2H_5)_4$, $Ti(OCH_3)_4$, $Ti(OC_4H_9)_4$, $CH_3Si(OCH_3)_3$, $(CH_3)_2Si(OC_2H_5)_2$, $C_4H_9Si(OCH_3)_3$, $C_6H_{13}Si(OCH_3)_3$ and the like. Metal compounds such as the acetylacetonates, e.g., titanium acetylacetonate and similar compounds, can be used.

The alkoxides and modified dye-containing polymers can be admixed in the presence of a solvent or inert liquid reaction medium to facilitate contacting the reactants. Preferably the liquid employed has at least some ability to dissolve one or more of the polymer, the metal compound, and the water used in the hydrolysis/condensation reaction, and/or be miscible with the covalently bonded composite formed by the hydrolysis/condensation reaction.

Alcohols are preferred reaction media. In a preferred embodiment, the alcohol corresponds to the alkoxy group present in the hydrolyzable metal compound and in the silyl group bonded to the dye-containing polymer. Thus, for example, if the metal compound is tetramethoxysilane, and the group on the dye-containing polymer is a trimethoxysilyl group, it is preferred to use methanol as the solvent.

The amount of solvent used is not critical. In general, enough solvent is employed to facilitate contact of the reactant and give a desired amount of fluidity to the reaction mixture. There is no real upper limit on the amount of solvent used; this usually being defined by such secondary considerations as size of reaction vessel, ease of recovering excess solvent, and cost. Within these parameters, it is within the skill of the art to select the amount of solvent to be employed. Typically, the amount of solvent is between about 40 and 80 weight percent of the reaction mixture. It is to be understood that solvents other than alcohols can be employed. Solvents such as an ether, e.g. tetrahydrofuran, or a halogenated hydrocarbon, such as methylene chloride can be used.

The hydrolysis/condensation reaction may be carried out in the presence of a catalyst, for example a compound which releases protons or hydroxyl ions or an amine. Examples of suitable catalysts are acids, preferably volatile acids, such as hydrochloric acid or acetic acid, inorganic bases, such as sodium hydroxide, potassium hydroxide or calcium hydroxide, or lower alkylamines, such as triethylamine, being preferred. The catalyst is preferably used in a quantity of up to 3% by weight, based on the reaction mixture.

The hydrolysis/condensation reaction is normally carried out at temperatures in the range from $-20°$ to $+130°$ C., preferably at temperatures in the range from $0°$ to $65°$ C. and, more particularly, at room temperature. The condensation time is determined by the particular starting components used and the quantities in which they are used, the catalyst used, and the reaction temperature.

The hydrolysis/condensation reaction may be carried out under normal pressure, elevated pressure or reduced pressure.

The reaction is conducted using a stoichiometric amount, or a substantially stoichiometric amount of water. By "stoichiometric" is meant the amount of water in moles required to hydrolyze the hydrolyzable groups in the silyl groups appended to the dye-containing polymer, and to completely hydrolyze the hydrolyzable groups in the metal compound $R_n^2M^2X_b$. For this invention, in calculating the amount of water that equals a stoichiometric amount, one ignores the water formed by condensation of silanol groups by the reaction

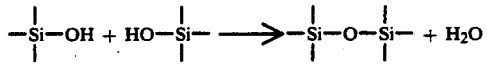

or the water formed by similar condensations of other metal hydroxy species. A "substantially stoichrometric amount" of water is defined herein as the stoichrometric amount plus or minus the amount of water in experimental error, e.g. ±10 weight percent.

The hydrolysis/condensation reaction accomplishes a number of important aspects. First, it produces the metal oxide heteropolycondensate which as set forth above, can be either a wholly inorganic or an organic-modified inorganic network). Second, it produces a linking group in a form that is reactable with the aforementioned network. For example, when a silicon species is used for the linkage in one embodiment of this invention, the dye-polymer will have

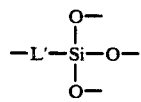

groups bonded thereto. Thirdly, it will bond the linking group with the network to produce the composite of this invention. For example, the bonding will take place through the unsatisfied valences in the linking group depicted above.

The hydrolysis/condensation reaction is conducted for a time sufficient to incorporate the dye within the resultant polymeric network by covalent bonding. The reaction time is not a truly independent variable, but is dependent at least to some extent on the temperature of the reaction, and the reactivity of the materials employed. As set forth in Example 1 which follows, incomplete reaction can result in the loss of color upon immersing the product in a solvent like methanol. As also demonstrated by that Example, the color fade can be eliminated or substantially eliminated by curing the product for a short time at an elevated temperature, i.e. a temperature above which the hydrolysis/condensation reaction is ordinarily conducted. Thus for example, it is possible to cure the product by heating it at a temperature of from about 175° C. to about 250° C., for from about one second to about one hour. A curing time from about 1.5 to about 2 minutes is preferred. The use of a curing step is a preferred embodiment of the invention.

It is believed that the curing step not only modifies the inorganic network, but also facilitates bonding of the dye polymer thereto. In those cases where an article other than a thin film is produced from a composite of the invention, it may be necessary to hold the article at a curing temperature for a comparatively longer period of time in order to accomplish the curing step within the interior of the article.

EXAMPLE 6

Step 1

A polymer intermediate (hereinafter designated PI-I) was prepared as follows:

A reaction mixture was produced from the following ingredients:

| | | |
|---|---|---|
| (1) | Dimethylsulfoxide (DMSO) | 2.92 kg |
| (2) | Isopropanol | 340 g |
| (3) | N-3-aminopropylmethacrylamide hydrochloride | 72 g (0.4 mole) |
| (4) | N-[3-(dimethylamino)propyl]-2-methyl-2 propenamide | 272 g (1.6 moles) |
| (5) | 4,4'-azobis(4-cyanovaleric acid) | 5.8 g (0.02 mole) | by combining them at room temperature. The resultant solution was purged with nitrogen for one hour, followed by heating 48 hours at 70° C. with continued slow nitrogen bubbling. The yellow polymer solution obtained was used directly for further derivatization.

| | |
|---|---|
| Final weight | 3565 g |
| Inherent viscosity | 0.31 dl/g (.25% in DMSO) |

Step 2

The polymer intermediate prepared above was employed to prepare Dye-Polymer 5 having 20 mole percent of Unit A, and 80 mole percent of Unit B.

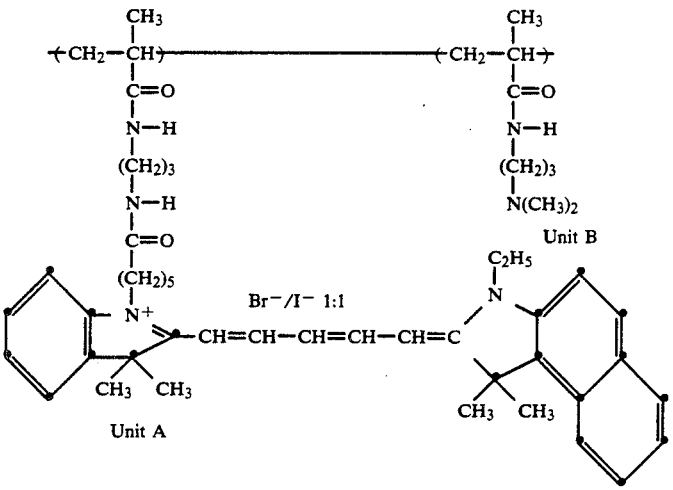

Step 3

A solution was prepared by mixing 1.5 g of 3-chloropropytrimethoxysilane, 8.8 ml of reagent grade methanol, and 1.5 grams of Dye-Polymer 5.

These reagents were chosen to facilitate a crosslinking reaction between the dimethylamino group of the organic polymer with the chloropropyl moiety of the sol-gel precursor.

The resulting deep blue solution was stirred under argon for 12 hours. Then, 1.5 ml (0.010 mol) of tetramethoxysilane was added followed by 0.72 ml (0.04 mol) of 0.15M HCl. The resulting solution was stirred at room temperature for 4 hours to facilitate the sol-gel reaction leading to a crosslinked inorganic polymer network containing the dye polymer.

The samples were then spin-coated on silicon or glass wafers at 2000 rpm for 60 sec. followed by curing at 200° C. for 90 sec. The spin-coated layer or film was about 2000 Å thick. It was found that color from an uncured sample could be removed by dipping the wafer into methanol, whereas no dye fade was detectable under similar circumstances with a sample cured at 175° C. The dye absorption band was unaffected by this treatment. Thus, a stable, hard, blue dye coating was produced.

EXAMPLE 7

Preparation of Dye-Polymer 6 having the formula:

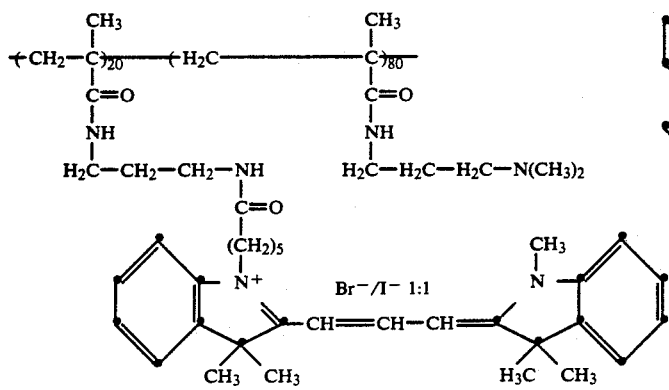

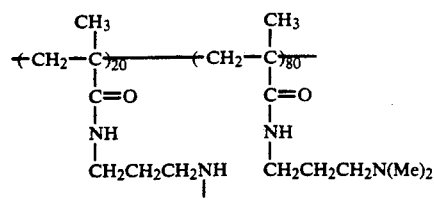

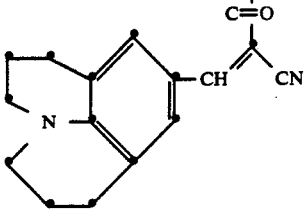

The reaction conditions were generally those in Example 6, above. The amount of starting polymer PI-I used was 89.1 g of solution, 0.01 moles amine hydrochloride. Reactant A (5.32 g, 0.011 mole) and Reactant B (4.89 g, 0.011 mole had the following formulas:

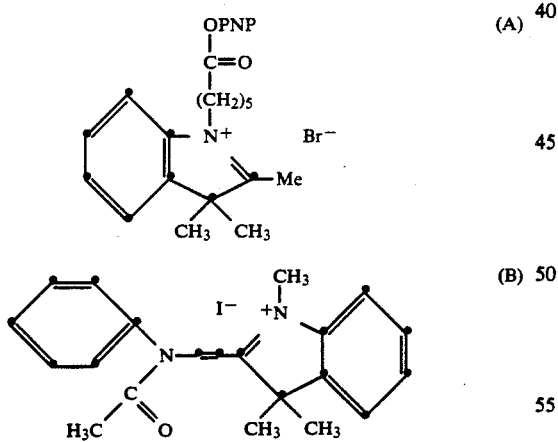

A 4.5 g portion of Dye-Polymer 6 was dissolved in 26.4 ml of methanol and 4.5 g of 3-chloropropyltrimethoxysilane, Thereafter, 4.5 ml of tetramethoxysilane, and 3.36 ml of a 0.15M HCl solution were added with stirring. A solution was obtained which was stirred at room temperature for 3 hours. This solution was then spin coated as described in Example 1 yielding a stable, hard magenta coating.

EXAMPLE 8

Dye-Polymer 7 having the formula:

was prepared; the reaction conditions employed generally followed those described in Example 6 above. The amount of starting polymer used was 89.1 g solution, 0.01 moles amine hydrochloride, A (3.9 g, 0.011 moles). The reaction mixture was heated 10 min. at 80° C., cooled and stirred at 20° C. for 3 hours. The product was precipitated in ether and triturated with acetone as described above.

| Final weight | 7.9 g yellow powder |
|---|---|
| Absorbance | 440 nm (MeOH) |

The lower temperature for this reaction required by the dye apparently leads to low conversion to dye-polymer.

Reactant (A) had the formula:

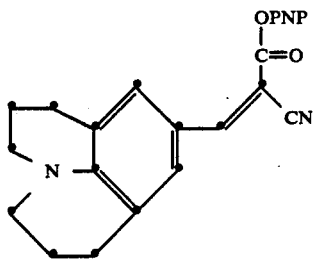

In this formula and above, PNP signifies p-nitrophenyl.

This dye-polymer can be transformed into a composite and film of this invention following the procedure set forth in the previous Example.

The above examples illustrate the formation of composites of this invention. Although the process illustrated by the above examples is widely applicable to composites of dye-containing polymers and metal oxide heteropolycondensates, the process is preferably conducted using silicic acid heteropolycondensates with the dye-containing polymers of the type illustrated by the Examples above. Thus, one preferred embodiment of this invention comprises a dye-containing polymer having the formula:

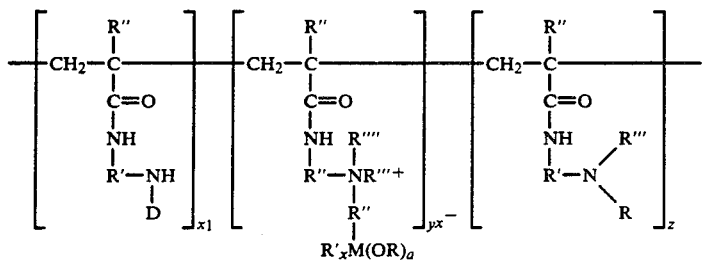

wherein each radical indicated by $R'$ is independently selected from lower alkylene radicals having up to about 4 carbon atoms, each radical indicated by $R'$, and $R'''$ is independently selected from lower alkyl radicals having up to about 4 carbon atoms, $R''''$ is selected from hydrogen and said lower alkyl radicals, and D is a dye unit; $x_1$, y and z are mole percent values such that the sum of $x_1+y+z$ is equal to 100, $x_1$ has a value such that the weight percent of dye unit D is within the range of from about 1 to about 80 percent by weight of said polymer, and y is within the range of from about 2 to about 40 mole %, and z is equal to $[100-(x_1+y)]$ mole percent; the total number of repeating units in said polymer being in the range of from about 50 to about 500, $(x+a)$ is equal to one less than the valence of the metal M, and x is equal to 0 or 1.

In a preferred embodiment, $R'$ is equal to n-propyl, and $R'''$ is methyl. In another preferred embodiment the molecular weight is in the range of from about 20K to about 100K. In another preferred embodiment, $x_1$ is in the range of 2 to 20 mole %, y is in the range of 2 to 40 mole %, and z is equal to $[100-(x_1+y)]$ mole percent. Materials within these embodiments can be made by the procedure set forth in the above examples.

In summary, this invention relates to composites of an inorganic metal oxide network covalently bonded to a dye containing polymer. The metal oxide network can be totally inorganic, as shown in the above examples, or it can be modified by organic groups bonded to the metal atoms in the network. When an organic-modified network is selected, one utilizes a reactant containing an organic group bonded directly to a metal atom as the starting material for the heteropolycondensate. Such a reactant is employed analogously to the tetramethoxysilane used in the examples. If desired, one can use another alkoxysilane such as tetraethoxysilane to prepare an inorganic oxide network. The results are similar to those set forth above.

Thus, the process of this invention comprises reacting a dye containing polymer with a material capable of forming a metal oxide heteropolycondensate upon hydrolysis and condensation. The dye-containing polymer contains a group that is capable of entering into the hydrolysis and condensation so that covalent bonding between the polymer and the inorganic network takes place. In general, the reaction is conducted using conditions analogous to those in the art for conducting a sol-gel process. However, as explained above, the process can comprise a curing step conducted at a somewhat elevated temperature to combat dye loss from leaching. For example, if desired, Examples 5–8 can be modified by inclusion of a curing step.

The invention has been described in detail with particular reference to preferred embodiments thereof, but it will be understood that variations and modifications can be effected within the spirit and scope of the invention.

We claim:

1. Process for preparing a dye polymer/sol-gel composite, said process comprising reacting
    (a) a dye-polymer having a group $-L'-M^1R'_x(OR)_a$, and
    (b) and a metal compound $R_n{}^2M^2X_b$, with
    (c) a substantially stoichiometric amount of water; wherein
    $L'$ is a linking group bonding the $M^1R'_x(OR)_a$ moiety to the dye-polymer, the metals $M^1$ and $M^2$ are alike or different and selected from the class consisting of metals within Groups IA, IIA, IIIA, IVA, VA, IIB, IIIB, IVB, VB, and VIB of the Periodic Table, each radical indicated by R, $R'$, and $R^2$ is alike or different and selected from alkyl radicals having one to about four carbon atoms,
    X is a hydrolyzable group,
    $(x+a)$ is a positive integer equal to one less than the valence of the metal $M^1$, x being equal to 0 or 1,
    n is equal to zero, 1, or 2, and
    b is equal to the valence of metal $M^2$ minus the value of n.
2. Process of claim 1 wherein $M^1$ and $M^2$ are silicon.
3. Process of claim 2 wherein $R_n{}^2M^2X_b$ is $Si(OR)_4$.
4. Process of claim 3 wherein $Si(OR)_4$ is tetramethoxysilane.

* * * * *